(12) United States Patent
Dark

(10) Patent No.: US 7,058,976 B1
(45) Date of Patent: Jun. 6, 2006

(54) INTELLIGENT FEEDBACK LOOP PROCESS CONTROL SYSTEM

(75) Inventor: Susan Pittman Dark, Dallas, TX (US)

(73) Assignee: Deep Nines, Inc., Dallas, TX (US)

( * ) Notice: Subject to any disclaimer, the term of this patent is extended or adjusted under 35 U.S.C. 154(b) by 130 days.

(21) Appl. No.: 09/572,112

(22) Filed: May 17, 2000

(51) Int. Cl.
*G06F 11/30* (2006.01)

(52) U.S. Cl. .............................. 726/23; 726/1; 726/12; 713/188; 709/223; 709/224

(58) Field of Classification Search ................ 713/153, 713/168, 170, 188, 200, 201; 709/223, 224–227, 709/229, 232, 238, 249, 395.52; 706/13, 706/14, 43; 370/338, 351; 726/1, 12, 23
See application file for complete search history.

(56) References Cited

U.S. PATENT DOCUMENTS

| | | | |
|---|---|---|---|
| 5,319,776 A | | 6/1994 | Hile et al. |
| 5,414,650 A | | 5/1995 | Hekhuis |
| 5,623,601 A | | 4/1997 | Vu |
| 5,649,095 A | | 7/1997 | Cozza |
| 5,787,253 A | | 7/1998 | McCreery et al. |
| 5,799,002 A | | 8/1998 | Krishnan |
| 5,828,846 A | * | 10/1998 | Kirby et al. ................. 709/238 |
| 5,835,726 A | | 11/1998 | Shwed et al. |
| 5,913,041 A | | 6/1999 | Ramanathan et al. |
| 6,052,788 A | | 4/2000 | Wesinger, Jr. et al. |
| 6,061,798 A | | 5/2000 | Coley et al. |
| 6,098,172 A | | 8/2000 | Coss et al. |
| 6,119,165 A | | 9/2000 | Li et al. |
| 6,119,236 A | | 9/2000 | Shipley |
| 6,182,226 B1 | | 1/2001 | Reid et al. |
| 6,205,551 B1 | | 3/2001 | Grosse |
| 6,219,786 B1 | | 4/2001 | Cunningham et al. |
| 6,222,856 B1 | | 4/2001 | Krishnan et al. |
| 6,263,444 B1 | | 7/2001 | Fujita |
| 6,279,113 B1 | | 8/2001 | Vaidya |
| 6,298,445 B1 | | 10/2001 | Shostack et al. |
| 6,301,668 B1 | | 10/2001 | Gleichauf et al. |
| 6,321,336 B1 | | 11/2001 | Applegate et al. |
| 6,370,648 B1 | * | 4/2002 | Diep .......................... 713/201 |
| 6,513,122 B1 | | 1/2003 | Magdych et al. |
| 6,550,012 B1 | * | 4/2003 | Villa et al. .................. 713/201 |
| 6,598,034 B1 | * | 7/2003 | Kloth .......................... 706/47 |

(Continued)

FOREIGN PATENT DOCUMENTS

JP 08 186569 7/1996

(Continued)

OTHER PUBLICATIONS

PCT International Search Report (PCT/US02/17426) dated Feb. 28, 2003.

(Continued)

*Primary Examiner*—Ayaz Sheikh
*Assistant Examiner*—Taghi T. Arani
(74) *Attorney, Agent, or Firm*—Fulbright & Jaworski LLP

(57) ABSTRACT

There is disclosed a system and method for detecting attacks on a site in a communication network and for taking action to reduce or redirect such attacks. A monitor system reviews incoming data packets and sends directions to at least one router to change the data flow in the system. The directions may be sent to other routers. The data packets and the resulting work flow are modified for certain conditions, and for certain conditions within defined time slices, and action is taken when the monitored condition is contrary to expected conditions.

13 Claims, 2 Drawing Sheets

U.S. PATENT DOCUMENTS 6,615,358 B1 * 9/2003 Dowd et al. .......... 713/201
6,711,127 B1 3/2004 Gorman et al.

FOREIGN PATENT DOCUMENTS

WO  WO 00/11841  3/2000
WO  WO 01/16664  3/2001

OTHER PUBLICATIONS

Ishibashi, H. et al. "A Protection Method against Unauthorized Access and Address Spoofing for Open Network Access System." IEEE, US, vol. 1 of 2. Conf. 8, Aug. 26, 2001, pp. 10-13.

Kanlayasiri, Urupoj, et al. "Detecting Denial of Service using BENEF Model: An Alternative Approach." Applied Network Research Group Department of Computer Engineering, Kasetsart University, Chatuchak, Bangkok, Thailand, Feb. 2001, pp. 1-8.

Whalen, Sean, An Introduction to Arp Spoofing. Revision 1, Apr. 2001, pp. 1-6.

"IP-Spoofing Demystified." Phrack Magazine, vol. 7, Issue 48, File 14 of 18, Jun. 1996, pp. 1-9.

"Sleuth9." Datamation, [on-line] http://products.datamation.com/security/security/1011891069.html, retrieved on May 7, 2003, pp. 1&2.

Partial International Search Report, dated May 26, 2003.

Substitute motion and its accompanying claim charts.

Exhibits Relied Upon by Original and Substitute motions.

Original motion and its accompanying claim charts.

Nikkei Communications, Oct. 18, 1999, No. 304, p. 101-109, p. 185.

Nikkei Open Systems, Jan. 15, 2000, No. 82, p. 100-103, p. 321.

Japanese Office Action issued for Japanese Patent Application No. 2001-585,449 dated Sep. 6, 2005.

* cited by examiner

INTELLIGENT FEEDBACK LOOP PROCESS CONTROL SYSTEM

BACKGROUND

The problem that we are addressing exists in the functioning of the Internet or any communications network. Such networks are inherently vulnerable to at least two types of attacks which disrupt or disable the functioning of network services. The two general types of problems are called flooding attacks and pattern attacks. Flooding attacks typically occur by a ramping up of the volume of traffic on a particular Internet line. The attackers ramp up the volume by creating situations that encourage multiple computers to interact simultaneously to create a giant flood of information directed at a single source. This is a process that often is enabled by using "third party victim" computers so that the computers at legitimate innocent sites are used in a multiplicity to create and generate a high volume of requests to a target site unknown to the victim.

There are other types of volume attacks. Different programs are used to spoof addresses, which means that an attacker creates packets and places messages inside the packets to make it appear as if the packet is coming from a particular address, while, in fact, it is not coming from that address at all. For example, person "A" could mail a letter and put person "B's" return address on the letter. This sounds innocent enough, but when it comes to tracking these volume attacks, it becomes very difficult. Thus, these attacks not only have the ability to ramp up the volume, but they have the ability to hide themselves, giving them endless opportunities to do it again and again.

Another general type of attack is what is called by some a pattern or formatting attack. A formatting attack does not have so much to do with volume, but rather has to do with the quality of the information that is coming over the line. An attacker can format a packet in such a way that it can either 1) confuse the server so that the server does not know what to do to service the request; or 2) it can cause the server to go into loops or expend endless resources trying to service that single request. This can be thought of in terms of receiving a bogus message through the mail where the sender is pretending to be a high government official. The recipient then might be thrown into a turmoil trying to get information together to answer a bogus request when, in fact, the request was not official at all. Malformed packets can cause the same reaction. The recipient is unable to determine the "credibility" of the request, or is unable to validate or recognize a key portion of the packet, thereby creating a "state-of-confusion" loop.

SUMMARY OF THE INVENTION

These and other objects, features and technical advantages are achieved by a system and method which detects attacks on a site in a communication network.

One concept of the invention is the use of an intelligent feedback loop that recognizes the inherent vulnerability of the Internet and operates to redirect or block certain incoming, or outgoing, data packets. The inventive system and method, in one embodiment, is located at the perimeter of the system to be protected and allows for the installation of hardware and software configurations to address both the volume attacks and the formatting attacks. The system controls the amount of data that is allowed to flow in (or out) and controls the quality of the data that passes to the servers.

The system and method recognizes problems in the early stages as they are beginning to occur and communicates with a system router to essentially control the flow of all the communication in or out of the protected system (like a front door of a building). The system recognizes messages that are bound for the protected site and allows only certain data in. The allowed data must pass certain tests. Alternatively, all data is allowed in until an "alarm" condition is detected and then data is blocked. The blocked data can be general, or origination site specific.

The system is arranged to allow for dynamic "red lining" (a pre-determined level of traffic condition that causes a system overload) and for operator control of variables which are used to detect red line situations. Red line situations can be customized for each site for the end user and for the end user's servers depending upon, among other things, the capacity of those servers.

Also note that the physical hardware resources could be located at different locations across the country or different parts of the world and different communication paths may be utilized to complete the traffic particularly when the traffic is deemed to be legitimate. This means the customer can re-route traffic to alternate sites to optimize throughput and system performance. In this manner, high traffic can be diffused across the network and even perhaps routed to a more robust (faster, smarter, more secure, etc.) system for handling. The system (or systems) to which the traffic is redirected can be shared among a plurality of enterprises and can serve as a backup to many such enterprises.

One feature of the invention is to provide the end user with the ability to monitor and control the logistics of its protection, i.e., where it is physically located.

Another feature of the invention is to provide advance warning on an imminent crash situation, allowing the user site to take action to prevent down time.

One of the features of the invention is to provide a rapid dissemination of attack recognition and to provide recovery solutions whenever a new attack is recognized.

Another important feature of the invention is that pattern recognition is used to bring other equipment on line quickly to minimize outage time on the Internet.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
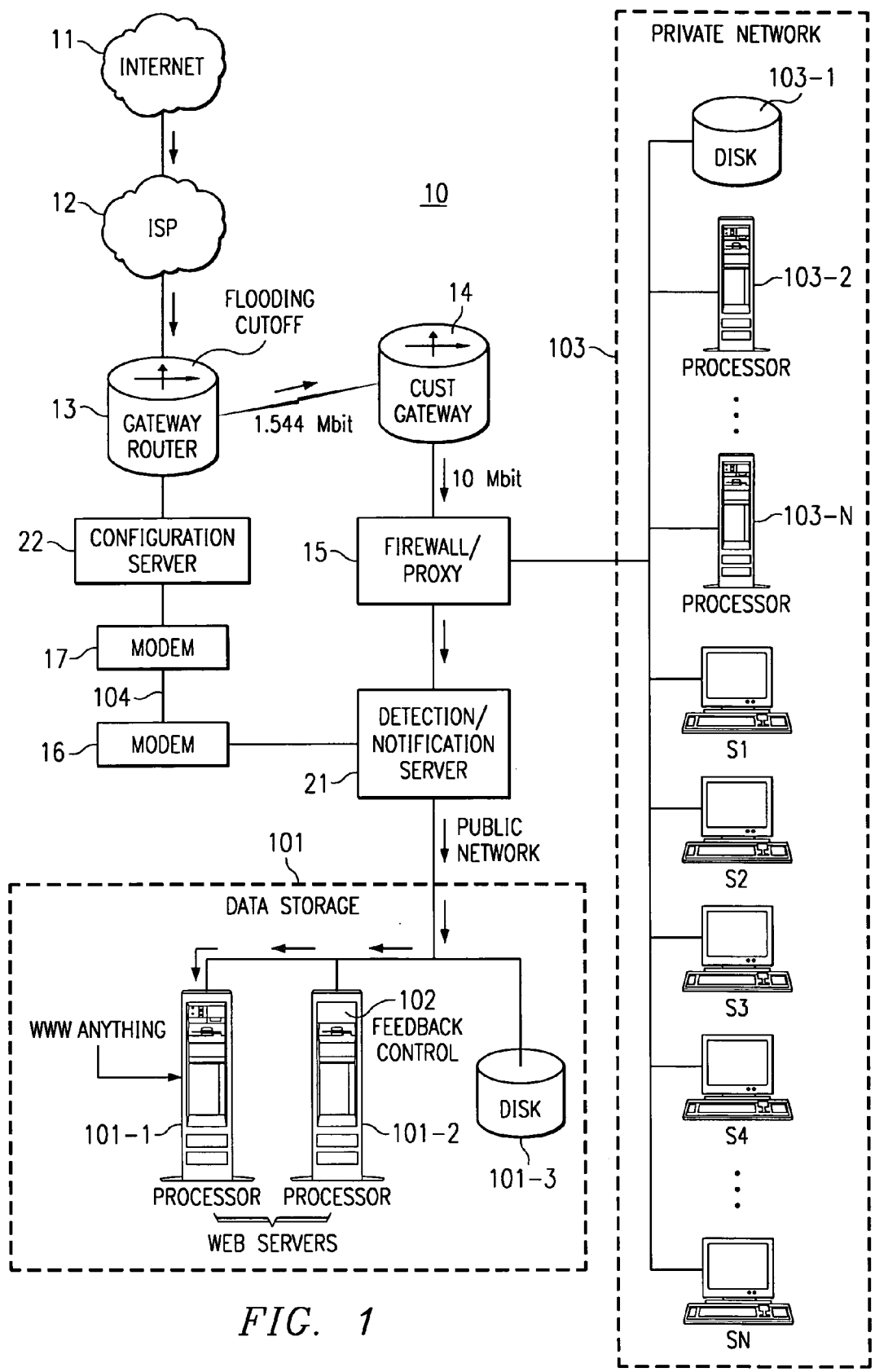
FIG. 1 shows an overall view of a network utilizing the invention.

Turning now to FIG. 1, system 10 shows a portion of Internet working 11 (or any communication network) where data flows into or out of Internet Service Provider (ISP) 12. Data from Internet 11 would typically have an address location which would be translated by a router, such as gateway router 13. In a typical situation, the devices which are accessible from the Internet which are located in data storage 101 have addresses such as "www.anything." This address is translated by gateway router 13, such that requests directed to "www.anything" would be routed to processor 101-1 in data storage 101 via gateway 14 and firewall 15.

Note that while the network is set as the Internet, any communication system will work, provided that there is a mechanism at some point in the network for rerouting communication connections upon direction from an external source. In the Internet, as it is known today, data is routed in packets, with each packet containing a portion of a data message and each packet containing an address portion as well as the message and perhaps other portions. Routers along the network serve to route each packet to the proper destination. The Internet is a temporal network in that a stream of packets from one location to another need not flow along any particular path, but, in fact, may take a plurality of different paths between locations. Often, however, entire message streams may take the same route, all depending upon traffic and other conditions as controlled by the network routers. The Internet is a changing network and the invention discussed herein is not limited to the Internet and it is contemplated that as the Internet changes so will the exact implementation of this invention; however, the concepts described and claimed herein are meant to teach those skilled in the art so that they may apply those concepts to an evolving technology without departing from the spirit and scope of this invention.

It should be further noted that the line speeds (1.544 Mbit between gateway router 13 and customer gateway 14 and 10 Mbit between customer gateway 14 firewall 15) are for illustration only, and any desirable speeds can be used. Also note that customer gateway 14 is optional and may not exist in some configurations and router 13 may connect directly to firewall 15, or if no firewall, then directly to server 21.

As will be discussed hereinafter, detection/notification server 21 is the communication path between firewall 15 (which can be any well known firewall, such as a UNIX based computer and data storage 101 for the purpose of protecting the system from unwanted attacks. This process will be discussed in more detail hereinafter with respect to FIG. 2.

Continuing now in FIG. 1, private network 103 (which is a company's internal network) can have any number of terminals, S1–SN, processors 103-2, 103-N and storage devices such as 103-1, and any other number of devices which interact with each other on an internal private network, or which use firewall 15 to access Internet 11 in a well known manner.

The incoming packets are routed from gateway router 13 (or from perhaps a wireless network (not shown)) to firewall 15, then go to detection/notification server 21, which (as will be detailed hereinafter) investigates the quality and quantity of the incoming requests, as well as other factors and determines whether or not a "red line" (defined as a condition wherein unusual action should be performed to protect the viability of the communication system) or other potential trouble situations exist. If a problem exists, detection/notification server 21 sends a command via modem 16 to modem 17 to configuration server 22 to instruct server 22 to perform an action with respect to gateway router 13. This action serves to address the attack by choking down the offending volume by stopping or reducing packet flow through router 13. In addition, detection/notification server 21 addresses the quality of data or the formatting type attacks by investigating the format of the incoming data and determining whether or not the format is acceptable to the processors within data storage 101. Note that modems 16 and 17 are shown essentially as land line telecommunication modems but, of course, could be any form of communications, or combinations could be used, including wireless, a private sub-network independent of the Internet, or even the Internet itself. However, since the Internet could be overloaded at this point in time and unless "special" override data can be used, communication external to the Internet (such as, for example, a phone connection or a wireless page message) would be employed. Also, while the communication is shown going to gateway router 13 which is closest to the customer's gateway, the communications could be sent (either concurrently or serially) to more remote routers to begin the process of rearranging the entire network structure so that the information which would have come to "www.anything" or to any other of the Internet addresses associated with this customer would be fully or partially routed to some other location remotely. This alternate location can be a backup processor in a remote location, or a trouble processing center, thereby freeing up the telecommunication capacity at site 101.

Figure 2:
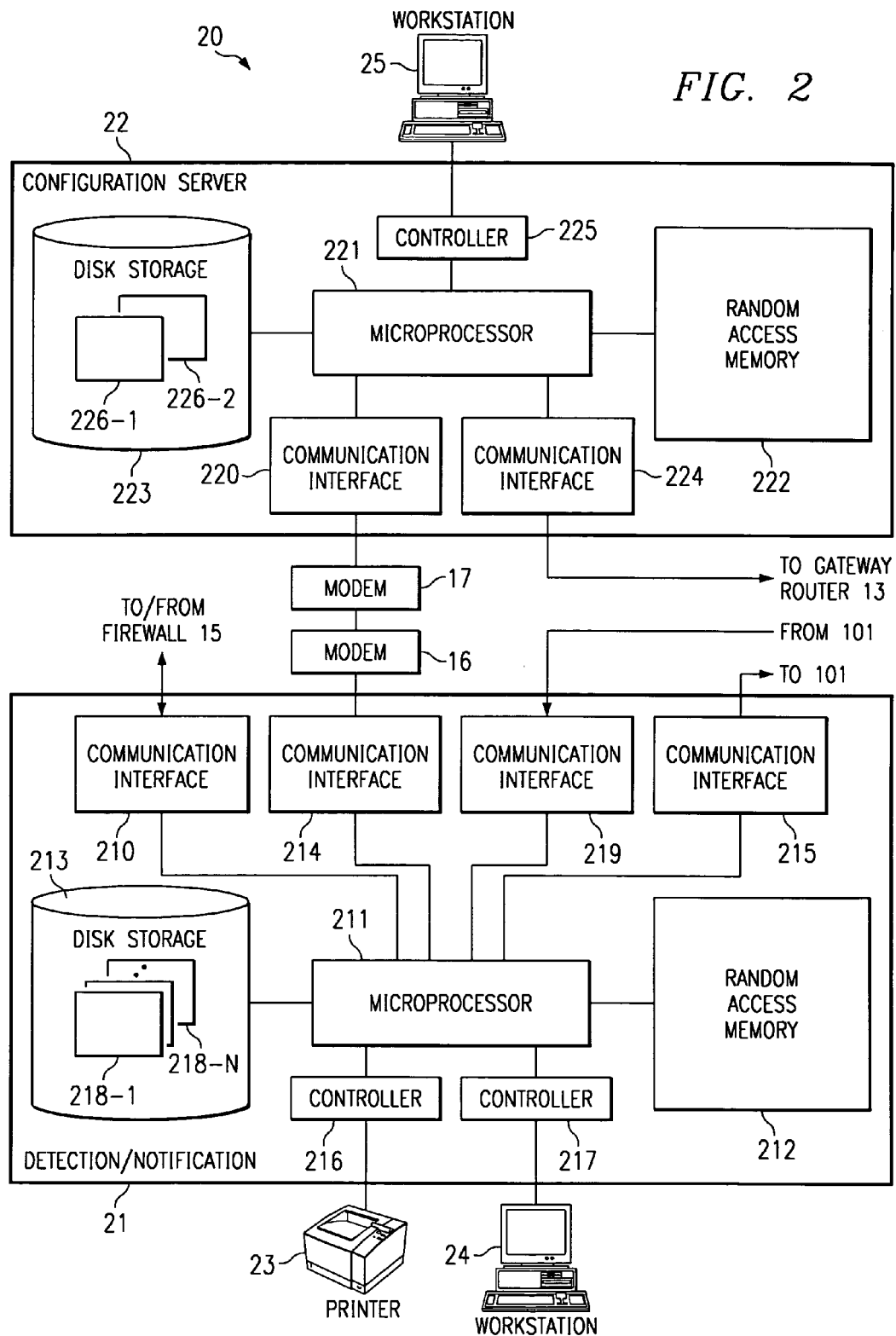
FIG. 2 shows details of the configuration and detection/notification servers.

Turning now to FIG. 2 there is shown system 20, which essentially consists of detection/notification server 21 and configuration server 22. Information packets come into the detection/notification server from firewall 15 via communication interface 210 and are intercepted by that interface and fed into microprocessor 211. Microprocessor 211 is at the same time loading programs from random access memory 212 which had been stored in disk storage 213. These programs are what logically intercept the incoming data within the random access memory. The programs operate to investigate the incoming data and to make determinations as whether to pass the data on without comment; pass the data on and perform other actions or block the data flow. Some of the other actions that may be taken include, but are not limited to: count packets versus time; count packets versus source; initiate communication with configuration server 22; recognize malformed packets; recognize suspicious or malicious traffic patterns; initiate communications with data servers 101-1, 101-2, and the like; and initiate various notification functions, such as pager and cell phone notification.

Data is accumulated and held in disk storage 213 in conjunction with RAM 212. If no problem exists, the packet is passed along via random access memory 212 to communication interface 215 and via port 101 to the servers where the requests are attended to by the servers in data storage 101. When a trouble situation appears to exist, server 21 performs one or more actions, depending upon the condition. If the condition is that incoming data is formatted improperly, then that data will not be passed along to data storage 101, but will be either held, returned or deleted, and the fact of it will be logged within the disk storage for future reference. Logs are maintained for all action taken and trouble activities. If, on the other hand, a red line process is recognized as a volume error or a flooding condition, then microprocessor 211 will be instructed to load software from disk storage 213 that will activate communication interface 214, thereby activating the link through modems 16 and 17 to send a command to configuration server 22. This command then passes through interface 220 to activate programs stored in random access memory 222, or in storage 223, under control of microprocessor 221. This in turn activates communication interface 224 to gateway router 13 to instruct the router to perform some action to choke down operation that will begin to limit the flooding operation to help solve the red line situation.

The modules that exist in storage 213 are 218-1 through 218-N and represent the software modules that comprise the logic of the system. By changing the programs, parameters and algorithms in storage 213, the system operation can be changed and upgraded for different types of attacks. These system changes, loaded on disk 213, can be manual (from station 24) or remote via the Internet or via any other course, such as wireless or direct connection (not shown) and can occur concurrently with attacks on other systems. Workstation 24 acts as a user interface into the process control system and enables technicians to activate the modules within disk storage 213 to do such things as to view and print the logs via printer 23 to address various settings that comprise the parameters that activate these modules. These parameters are some of the program factors that instruct the microprocessor as to what to do that will ultimately result in the intelligent actions of data storage 101, detection/notification server 21, or configuration server 22. All of these separate modules work together to activate each other in a logical order as will be described hereinafter.

Returning now to FIG. 1, the incoming data packets that come to detection/notification server 21 have within them requests, and these requests are requests of the processors in data storage area 101. It is the processing of these requests that really takes the most amount of time in the process of FIG. 1, so whenever something starts to go wrong, it is usually because the processors in data storage 101 become overloaded either through a volume attack or because of a format situation. The amount of time that it takes the detection/notification server 21 to deal with incoming messages is relatively insignificant with respect to the processing time of data storage 101 so that a little delay is not important.

The data flowing in to server 21 from firewall 15 could be buffered for an amount of time to allow microprocessor 211 to work on the data. However, it is anticipated that such buffering will not be required, and that the data will, if valid, be passed directly through with essentially no time lost. If the data is determined to be invalid, the data will be dropped (i.e., removed from the data traffic altogether), destroyed, returned or otherwise processed in accordance with the inventive concepts. Also note, that not every packet need be monitored and the degree of monitoring can be dynamically changed up or down depending upon results found. Thus, if an attack is sensed, the monitoring could be increased and the incoming gateway slowed (if desired) to allow for recovery.

System 10 has several concurrent processes running, which will now be detailed. These concurrent processes are:

| Process | Description | Location |
|---------|-------------|----------|
| CDM | Communication with Detection/Notification Server | Configuration Server |
| CR | Communication with Router(s) | Configuration Server |
| SA | System Administration | Configuration Server |
| NE | Notification Functions | Configuration Server |
| CDN | Communication with Detection/Notification Server | Data (Web) Servers |
| PSC | Packet and Source Counter | Detection/Notification Server |
| CCS | Communication with Configuration Server(s) | Detection/Notification Server |
| FPR | Packet Format & Pattern Recognition | Detection/Notification Server |
| CDS | Communication with Data Server | Detection/Notification Server |
| SA | System Administration | Detection/Notification Server |
| NE | Notification Functions | Detection/Notification Server |

The system also has on-demand processes, such as the following:

| Process | Description | Location |
|---------|-------------|----------|
| SSP | System Start Up | Configuration Server |
| SSP | System Start Up | Detection/Notification Server |

The following processes are operational in configuration server 22:

System Startup Process (SSP)
1) Initiates all concurrent processes and records information about the processes, such as sockets used, etc.
2) Builds an information block in memory for process CDM. The information block contains all necessary process information.
3) Ends the process.

Concurrent Communication with Detection/Notification (D/N) Server
1) When an information block is received from process SSP, it is sent to D/N Server 21 (FIG. 1) via modems 17 and 16.
2) Configuration server 22 then listens for communication from the D/N server. If the message is a "block," "unblock," or similar command for router action, an appropriate command block is prepared for process CR. If a "startup" message is received, that information about the D/N server is recorded. Log activity.
3) Configuration server 22 listens for acknowledgment requests from the D/N server. These requests are sent according to a specific time slice. If acknowledgments are not received, or only received partially, the configuration server builds an appropriate block for process NF and initiates appropriate actions. Log activity.
4) The server compiles and sends acknowledgments from all requested processes to the detection/notification server.

Concurrent Process CR (Communication with Routers)
1) The configuration server listens for a command block from process CDM and sends the command to the router(s) and logs the activity.
2) The server optionally receives acknowledgments from gateway router(s) 13. If such acknowledgments are absent when expected, the configuration server creates a record for process NF and takes other appropriate actions and logs the activity.

Concurrent Process SA (System Administration)
1) Display menu and information messages; accept operator input.
2) Checks for conditions that require operation response, such as: system file sizes have become critical; important parameters have been reset; an acknowledgment is needed, time delays (in and outbound) are beyond a set (or variable) limit.
3) The system will (among other functions) display or print logs, purge and archive data; and set system information, such as notification numbers, authorized numbers and addresses of detection/notification server(s), and possibly other attached equipment.

Concurrent Process NF (Notification Functions)
1) Listen for commands from other processes. When such commands are received, perform actions appropriate to the commands, such as activate pagers; activate calls to telephones; and activate other alarm mechanisms.

The following processes are operational in detection/notification server 21:

System Startup Process (SSP)
1) Initiates all concurrent processes and records information about the processes, such as sockets used, etc.
2) Builds an information block for process CCS with all process information. Log activity.
3) End process.

Concurrent Process Packet Format and Pattern Recognition (FPR)
1) Checks the configuration server(s). If any are off-line, generates a notification for process NF and checks for a "red line" (critical) condition in traffic flow; if one exists, takes appropriate action such as dropping the incoming packet. Log activity.
2) Verifies the format of incoming packets. If the verification test fails, takes appropriate action, such as dropping the packet or rerouting the packet to another location.
3) Checks packets for traffic pattern violations. If the test fails, it will note the severity. If a "red line" condition exists, the server takes appropriate action such as dropping the packet or generating a command to the CCS process to block specific traffic. Process NF may also be invoked. Log activity.
4) If a packet is not dropped, it is passed to process P.S.C.

Concurrent Process Packet and Source Counter (P.S.C.)
1) Updates traffic accumulators with information from the incoming traffic and counts total packets by time slice. Packets are also logged as to source; time slice; type; and any other desired parameters.
2) Sets an indicator if a "red line" or other warning level has been reached. If a "red line" condition exists, a command packet is produced for processes CCS and NF.
3) The packet is passed to process CDS.

Concurrent Process Communication with Configuration Server(s) (CCS)
1) Listens for communication from configuration servers. When a "startup" message is received, records the information about the configuration server processes. When acknowledgment messages have not been received within a specific time frame, a record is created for process NF and other appropriate action is taken.
2) When an acknowledgment message is received from a configuration server, an acknowledgment for each concurrent process is generated on the detection/notification server and this acknowledgment is sent to the configuration server. The server compiles requests for acknowledgment for each concurrent process and sends them.
3) The "listening" process is activated to await appropriate responses from the configuration server(s).
4) When a message is received from process FPR, an appropriate command block is built and sent to the configuration server. A record for process NF is prepared. Log activity.
5) Checks for the expiration of time on the "block traffic" condition for various sources. If expired, the server builds and sends an "unblock" command to the configuration servers. Log activity.
6) When an information block is received from process S.S.P., that information is sent to the configuration server.

Concurrent Process Notification Functions (NF)
1) The server listens for commands from other processes. When a command is received, the server performs actions appropriate to the command, such as activate pager(s); activate calls to telephones; and/or activate other alarm mechanisms. Log activity.

Concurrent Process Communication with Data Server(s) (CDS)
1) Whenever a packet has been received from another concurrent process, it is sent to the current outgoing communication port;
2) The server listens for messages from the data server(s). When such messages are received, the condition parameters are reset by process P.S.C. to adjust "red line" and other warning conditions on the basis of traffic levels;
3) Log activity.

Concurrent Process System Administration (SA)
1) Displays a menu and information messages; and accepts operator input;
2) Checks for conditions that require operator response, such as system file sizes have become critical; important parameters have been reset and an acknowledgment is needed.
3) Provides a variety of functions, such as display or print logs; purge and archive data; set system information, such as notification numbers, authorized numbers and addresses of configuration servers, and the like.

The following process is operational in data storage (web servers) 101:

Concurrent Process Communication with Detection/Notification Server (D/N Server(s))
1) Gathers statistics and/or notification messages, including warnings, and sends these to the D/N server(s).

While the invention has been described for operation with respect to a terminating device, or node, in a communication network, the concepts of this invention can be used at one or more network nodes or routing points along the network to help prevent attacks to either the network or to terminating devices connected to the network.

Also note there can be many different methods for determining a variation from a "normal" condition. As discussed, a base line of expected operation can be maintained in the data base either on a slice of time basis, such as by the minute, hour, day, etc., or there can be a prediction of expected behavior based upon past experience, anticipated experience (either hand keyed in or automatically developed based on parameters available to the system) or by the loading of certain "triggers" (such as virus triggers, code words, patterns of activity, or the like). For example, relevant information for this determination may include: the number of arriving packets in a particular time interval; the type of requests contained within given packets; the nature of the informational content of the packets; the sending identity of the packets; the response destination of the packets; the traffic patterns formed by packets from specific sources; the number of arriving packets from specific sources; certain data contained in one or more messages; and the type of file attached to a message. Thus, if a particular piece of code, or name extension, or attachment, is thought to be a problem the system would filter all (or a selected subset) of the data coming in to determine if the trouble code (name, extension, attachment, etc.) is present.

The system and method are designed to take action dependent upon the variation from a selected, or monitored, "normal" condition. The action taken can be graduated to suit the attack or could be the same regardless of the severity. Any number of methods can be used to compare the actual current behavior of the enterprise system against the expected behavior or to compare the data flowing into (or out of) the enterprise system against a pattern of behavior that has been identified as being a potential problem.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting attacks on a network, comprising:
    at a gateway, receiving data from a remote source which is destined for a target;
    discarding the data based on a predetermined set of rules utilizing a firewall associated with the gateway which is coupled to the remote source, wherein the firewall utilizes the predetermined set of rules to discard the data as a function of a plurality of parameters;
    passing remaining data to an intrusion detection system coupled to the firewall associated with the gateway;
    intercepting in real time the remaining data utilizing the intrusion detection system;
    parsing the remaining data to identify data representing text therein utilizing the intrusion detection system;
    comparing the data representing text to a predetermined list of data representing text associated with attacks utilizing the intrusion detection system, wherein the data representing text of the predetermined list refers to different types of attacks;
    identifying the data representing text as hostile based on the comparison; and
    acting on the data representing text identified as hostile in order to prevent an attack, wherein the data representing text identified as hostile is acted upon differently based on the type of the attack by at least one of blocking the data, alerting an administrator, and disconnecting the remote source.

2. The method as recited in claim 1 wherein the firewall utilizes the predetermined set of rules to discard the data as a function of a plurality of parameters including the source, the destination, and the port associated with the data.

3. The method as recited in claim 1 wherein the data representing text of the predetermined list refers to different types of attacks including the information gathering attacks, the web server denial of service attack, and the file server remote compromise.

4. The method as recited in claim 1 wherein the predetermined list of data representing text associated with attacks is manually updated.

5. The method as recited in claim 1 further comprising updating the predetermined list of data representing text associated with attacks.

6. The method as recited in claim 1 wherein the firewall and the intrusion detection system are included in a single device.

7. A gateway system for detecting attacks on a network, comprising:
    a firewall for receiving data from a remote source which is destined for a target, and discarding the data based on a predetermined set of rules;
    an intrusion detection system coupled to the firewall for intercepting in real time remaining data, parsing the remaining data to identify data representing text therein, and comparing the data representing text to a predetermined list of data representing text associated with attacks, wherein the data representing text of the predetermined list refers to different types of attacks; and
    acting on the data representing text identified as hostile in order to prevent an attack, wherein the data representing text identified as hostile is acted upon differently based on the type of the attack by at least one of blocking the data, alerting an administrator, and disconnecting the remote source, the intrusion detection system further capable of updating the predetermined list of data representing text associated with attacks.

8. The system as recited in claim 7 wherein the firewall and the intrusion detection system are included in a single device.

9. The system as recited in claim 7 wherein the firewall utilizes the predetermined set of rules to discard the data as a function of a plurality of parameters including the source, the destination, and the port associated with the data.

10. The system as recited in claim 7 wherein the data representing text of the predetermined list refers to different types of attacks including the information gathering attacks, the web server denial of service attack, and the file server remote compromise.

11. The system as recited in claim 7 wherein the predetermined list of data representing text associated with attacks is manually updated.

12. A method for detecting attacks on a network, comprising:

at a gateway, receiving data from a remote source which is destined for a target; discarding the data based on a predetermined set of rules utilizing a firewall associated with the gateway which is coupled to the remote source, wherein the firewall utilizes the predetermined set of rules to discard the data as a function of a plurality of parameters selected from the group consisting of a source, a destination, and a port associated with the data;

passing remaining data to an intrusion detection system coupled to the firewall associated with the gateway;

intercepting in real time the remaining data utilizing the intrusion detection system;

parsing the remaining data to identify data representing text therein utilizing the intrusion detection system;

comparing the data representing text to a predetermined list of data representing text associated with attacks utilizing the intrusion detection system, wherein the data representing text of the predetermined list refers to different types of attacks selected from the group consisting of information gathering attacks, a web server denial of service attack, and a file server remote compromise;

identifying the data representing text as hostile based on the comparison;

acting on the data representing text identified as hostile in order to prevent an attack, wherein the data representing text identified as hostile is acted upon differently based on the type of the attack by at least one of blocking the data, alerting an administrator, and disconnecting the remote source; and updating the predetermined list of data representing text associated with attacks;

wherein the firewall and the intrusion detection system are included in a single device.

13. A gateway system for detecting attacks on a network, comprising:

a firewall for receiving data from a remote source which is destined for a target, and discarding the data based on a predetermined set of rules, wherein the firewall utilizes the predetermined set of rules to discard the data as a function of a plurality of parameters selected from the group consisting of a source, a destination, and a port associated with the data;

an intrusion detection system coupled to the firewall for intercepting in real time remaining data, parsing the remaining data to identify data representing text therein, and comparing the data representing text to a predetermined list of data representing text associated with attacks, wherein the data representing text of the predetermined list refers to different types of attacks, selected from the group consisting of information gathering attacks, a web server denial of service attack and a file server remote compromise, the intrusion detection system further capable of identifying the data representing text as hostile based on the comparison, and acting on the data representing text identified as hostile in order to prevent an attack, wherein the data representing text identified as hostile is acted upon differently based on the type of the attack by at least one of blocking the data, alerting an administrator, and disconnecting the remote source, the intrusion detection system further capable of updating the predetermined list of data representing text associated with attacks;

wherein the firewall and the intrusion detection system are included in a single device.

* * * * *